No. 749,256. PATENTED JAN. 12, 1904.
E. E. BROWN.
NUT LOCK WASHER.
APPLICATION FILED SEPT. 26, 1903.
NO MODEL.

Witnesses:
R. E. Randle,
Harry J. Doan

Inventor,
E E Brown,
By his Attorney,
Robert W. Randle

No. 749,256.  
Patented January 12, 1904.

UNITED STATES PATENT OFFICE.

EVERETT E. BROWN, OF RICHMOND, INDIANA.

NUT-LOCK WASHER.

SPECIFICATION forming part of Letters Patent No. 749,256, dated January 12, 1904.

Application filed September 26, 1903. Serial No. 174,730. (No model.)

*To all whom it may concern:*

Be it known that I, EVERETT E. BROWN, a citizen of the United States, residing in the city of Richmond, in the county of Wayne, and in the State of Indiana, have invented new and useful Improvements in the Construction and Application of Nut-Locking Washers; and I hereby declare the following to be a full, clear, and exact description of the invention, such as will enable others skilled in the art to which it appertains to make and use the same.

My invention has reference to means for locking nuts in their adjusted position on a bolt to prevent the nut from inadvertently turning or becoming loosened.

My present invention contemplates the provision of a washer or the like; and the invention relates to the shape and construction thereof whereby I provide means for securely locking bolt-nuts at any desired point, whereby they may not accidentally be turned.

Another object is to provide a simple, sure, efficient, and economical means for locking nuts on bolts or the like which will be inexpensive and simple in construction and operation and which will perform its mission with certainty and precision, and, finally, perhaps the most important object is to provide means for locking nuts in their adjusted position on bolts without in any manner whatever changing the construction of bolts and nuts now in use.

The above and other specific objects which will appear in the course of this specification I obtain by the construction shown in the accompanying drawings, in which—

Figure 1:
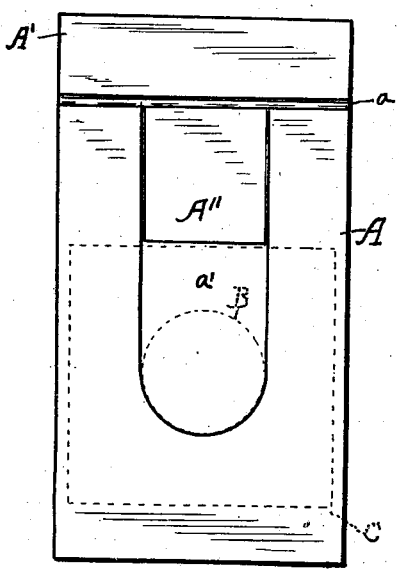
Figure 2:
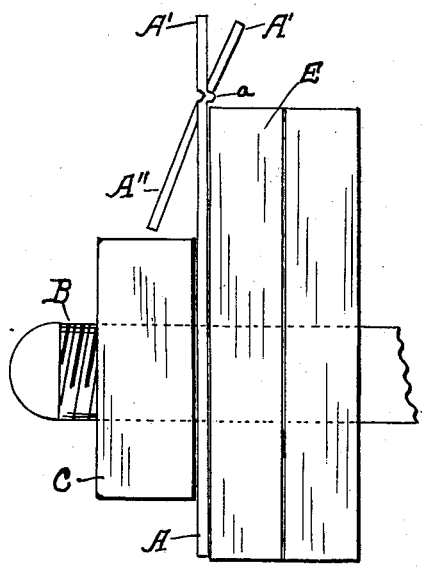
Figure 3:
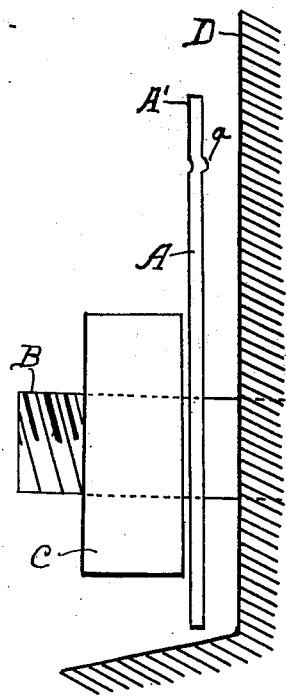

Figure 1 is a plan or face view of my washer in its preferred form of construction. Fig. 2 is a side elevation of my washer, showing the application of same in connection with a bolt and nut and the elements secured thereby; and Fig. 3 is a view similar to Fig. 2, showing a different application of my invention.

Similar indices refer to and denote like parts throughout the several views.

In order that the construction and operation of my invention will be fully understood, I will now take up the description thereof in detail, which I will refer to as briefly and compactly as I may.

The letter A denotes my washer entire, as shown in Fig. 1, consisting of a rectangular plate A, preferably of sheet metal, with an opening $a'$ formed therethrough, said opening $a'$ having two parallel sides, an upper end at right angles to said sides, and a lower segmental end opposite to said upper end, whose curvature corresponds to the rondure of the bolt to be used therein. Across the washer in its upper portion is a U-shaped impression $a$, forming a ridge across the back of the washer. On a line with each of the sides of the opening $a'$ are slits, which extend from said opening $a'$ up to said impression $a$, as shown, forming a tongue $A''$, and the portion of the washer above the impression $a$ forms a flap $A'$, as shown.

An edge view of the washer shown in Fig. 1 would appear as in Fig. 3 before it was used to lock a nut, and as in Fig. 2 after a nut was locked thereby.

In Fig. 2 the letter E denotes one or more elements to be secured by the bolt B and the nut C, while in Fig. 3 the letter D denotes the element to be secured, which latter has a lower flange, as shown.

In operation the bolt is placed through the material to be bound with the threaded end of the bolt projecting in the usual manner. My washer A is then contacted with the face of the element E or D in the manner indicated. The nut C is then screwed on the bolt B, contacting the washer A between it and the face of the element to the desired tightness, and after the nut C is positioned the upper edge of the flap $A'$ may be struck back with a hammer, bending the washer on the line of the impression $a$, which will cause the tongue $A''$ to be carried outward at an angle, as shown in Fig. 2, whereby its lower end will be disposed across above the upper end of the nut C, and thus effectually preventing the nut from being turned in either direction until the said tongue shall have been bent inward or outward out of the track in which the nut may turn.

The washer may be prevented from turning in a variety of ways according to the circumstances and purposes for which it may be used: by its contact with the face of the element, as in Fig. 2 by the impression $a$, resting above and near the upper edge of the element E, or the washer may extend below the element E at the bottom and then be bent around its corner, and as in Fig. 3 the element D may have a flange on its lower portion, on which the washer may rest, as in the case of railway-rail connections.

From the above it will be seen that my invention consists of but a single integral piece of material formed substantially as shown and capable of locking the nut at any desired point on the bolt, while at the same time serving the purposes of a washer, and also it will be apparent that I have accomplished the objects elsewhere referred to in this specification.

While I have illustrated and described the best means now known to me for the accomplishment of my invention, I wish it to be understood that I do not restrict myself to the exact details of construction shown and described, but hold that any slight changes or variations in such details as would suggest themselves to the ordinary mechanic would clearly fall within the limit and scope of my invention.

After making the above exposition of my invention and its intended operation what I claim, and desire to secure by Letters Patent of the United States, is—

1. In combination with a bolt and nut, of a rectangular washer having a central lunette aperture therethrough, a U-shaped impression formed across the upper portion of the washer, and a tongue extending down from said impression its lower edge forming the upper end of said aperture and whose length is such as to permit it to be forced outward over the edge of the nut, all substantially as shown and described for the purposes set forth.

2. The combination with a bolt and nut, of a washer adapted to surround the bolt and contact with the rear face of the nut, an impression formed in the face of the washer across upper portion thereof and forming a ridge across the back of the washer, a tongue formed in the center of the washer whose lower edge is adapted to be extended out over the upper edge of the nut for securing the nut in its adjusted position, substantially as shown and described.

3. A rectangular nut-locking washer having a central elongated aperture for a bolt, an impression in the face of the washer forming a ridge across the back of the upper portion thereof, a tongue extending down from near said ridge and of a length to coincide with the upper edge of said aperture above the upper edge of the nut, substantially as shown and described.

4. A rectangular nut-locking washer having a central elongated aperture, an impression across the upper face of the washer forming a ridge on the back thereof, a tongue of same width as said central aperture extending down therein from said impression to a point slightly above the upper edge of the nut, all substantially as shown and described.

5. In combination with a bolt and nut and the elements to be secured thereby, of an oblong plate having a central opening with slits extending up from each side of said opening to near the upper end of the washer, a tongue formed by said slits and extending down to a point slightly above the upper edge of the nut, an impression formed across the upper portion of the washer, means for extending said tongue after the nut is screwed home, and means for securing the washer, all substantially as shown and described.

6. A nut-locking washer having a central elongated opening for the bolt, an impression formed across one end of the washer, a tongue formed between said impression and said opening and extending to near the edge of the nut, means for partially extending said tongue to lock the nut, and means for securing the washer between the nut and the element secured by the bolt, substantially as shown and described.

In testimony whereof I have hereunto signed my name to this specification in the presence of two subscribing witnesses.

EVERETT E. BROWN.

Witnesses:
   R. E. RANDLE,
   R. W. RANDLE,